United States Patent [19]

Choiniere et al.

[11] 4,063,988

[45] Dec. 20, 1977

[54] MACHINE AND METHOD FOR FORMING CONTINUOUS TUBING

[75] Inventors: Alcide W. Choiniere, Abbeville; Thomas A. Kutnyak, Greenwood; George T. Dunn, Abbeville, all of S.C.

[73] Assignee: Automation Industries, Inc., Los Angeles, Calif.

[21] Appl. No.: 685,493

[22] Filed: May 12, 1976

[51] Int. Cl.² .................................................. B65H 81/00
[52] U.S. Cl. ...................................... 156/429; 156/189; 156/195; 156/446
[58] Field of Search ................ 186/143, 144, 195, 425, 186/428–429, 191, 189, 446; 138/129, 154; 93/80

[56] References Cited

U.S. PATENT DOCUMENTS

| | | | |
|---|---|---|---|
| 2,398,876 | 4/1946 | Bailey | 156/195 X |
| 2,695,631 | 11/1954 | Seck | 156/143 X |
| 2,759,521 | 8/1956 | Hall et al. | 156/429 |
| 3,173,822 | 3/1965 | Rigaut | 156/143 X |
| 3,532,580 | 10/1970 | Kanao | 156/428 X |
| 3,778,327 | 12/1973 | Fairchild | 156/143 X |
| 3,914,147 | 10/1975 | Wienand et al. | 156/429 X |

*Primary Examiner*—David A. Simmons
*Attorney, Agent, or Firm*—Thomas L. Flattery

[57] ABSTRACT

A machine for and a method of forming a continuous tubing of flexible material, said tubing being wound in helical fashion and having interlocking edge portions. The machine includes a pair of spaced askew related rollers about which a strip of flexible material is wound, one of the rollers having a plurality of annular fins spaced apart the width of the strip of flexible material to partially receive the strip between portions of adjacent fins. The other of said rollers may have a single annular fin. Guide means contact external surfaces of edge interlocking portions of the wound strip. Both of said rollers are driven at the same speed. In the method of forming such a flexible continuous tube the improvement comprises positively engaging internal surfaces of turns of the strip being wound for advancing the strip in one direction and positively engaging external surfaces of a portion of at least one turn of the strip being wound for guiding the strip on the pair of rollers.

6 Claims, 9 Drawing Figures

MACHINE AND METHOD FOR FORMING CONTINUOUS TUBING

BACKGROUND

The continuous flexible tubing made and formed by the machine and method of the present invention is of the type shown in Richitelli U.S. Pat. No. 3,199,541. The cross sectional configuration of the strip from which the tube is made includes a longitudinally extending bead along one edge portion and a longitudinally extending downwardly facing groove along the other edge portion of the strip, the groove being configured to correspond with the shape of the bead to snugly interlock therewith. Richitelli U.S. Pat. No. 3,199,541 describes forming of the tubing by wrapping the strip of flexible material helically about a mandrel with the flat bottom surface of the strip in contact with the mandrel.

In Fairchild U.S. Pat No. 3,778,327 a flexible tubing is formed on a mandrel means which comprises a pair of rollers having their axes in askew relation, the mandrels being formed with annular grooves. Fairchild discloses the wrapping of a strip of flexible material which is planar about the roller surfaces and at the same time feeding a wire onto a portion of the strip and in alignment with a groove in the mandrel so that the tension of the wire and strip cause the face of the strip in contact with the mandrel to conform to the mandrel groove formation. In Fairchild the strips of material are overlapped and the wire serves to reinforce the tubing. In Fairchild U.S. Pat. No. 3,778,327 both rollers of the mandrel means include annular grooves and only one of the rollers is driven, the other roller being an idle roller.

Both of the above U.S. Pat. Nos. 3,199,541 and 3,778,327 are owned by Automation Industries, Inc. which is also the owner of the present invention and application.

SUMMARY

The present invention relates to a machine and method for forming a continuous tubing from a strip of flexible material having a cross sectional configuration similar to that shown in Richitelli U.S. Pat. No. 3,199,541 by utilizing a mandrel means having a pair of rollers in askew relation similar to the Fairchild U.S. Pat. No. 3,778,327. The present invention relates to improvements in the machine utilizing a mandrel means having dual rollers whereby the mandrel means is readily adjusted in such a manner that continuous tubing of different diameter may be made by the same rollers, the machine is adapted to form continuous tubing of a strip of material having a cross section including interlocking edge portions, the machine is adapted to form a continuous tubing of undetermined length inasmuch as the strip of flexible material may be fed to the mandrel means directly from an extruder, and wherein the pair of rollers forming the mandrel means are both positively driven at a uniform rotational speed.

The present invention contemplates a novel construction of the pair of rollers forming the mandrel means whereby the aces of the roller are arranged in askew relation and may be adjusted to different spaced relation for forming tubing of different diameter. The invention contemplates that at least one of the rollers be provided with a plurality of radially outwardly extending annular fins spaced apart a distance related to the width of the strip of flexible material being fed to the mandrel means so that the strip of material wound upon the mandrel means will be received between adjacent fins and will be retrained from creeping movement relative to the axis of the rollers.

It is therefore a primary object of the present invention to provide a novel machine and method for forming a continuous tube from a strip of material having interlocking edge portions which incorporates improvements over prior proposed constructions known to us.

A primary object of the present invention is to provide a machine wherein a pair of rollers with axes in skew relation define the inner surface of a continuous tube being formed and wherein at least one of said rollers is provided with means for positive engagement of the strip of material by the roller so that the strip of material may be positively advanced in a helical arrangement.

Another main object of the present invention is to provide a novel method for forming a continuous flexible tubing having interlocked edge portions wherein during formation of the tubing there is positive engagement of internal surfaces of the strip and tube formed thereby and there is also positive engagement of external interlocked edge portions of the formed tubing whereby the interlocked edge portions of the strip are uniformly engaged and bonded together.

An object of the present invention is to provide a novel machine for forming continuous tubing wherein a pair of rollers having axes in skew relation and forming the mandrel means are readily adjustable to provide tubing of different diameter.

Another object of the present invention is to provide a machine for forming continuous flexible tubing of the type having interlocked edge portions wherein the rate of speed of tube forming is substantially increased over the rate of speed of forming similar tubing by prior proposed machines.

A further object of the present invention is to provide a machine for forming a continuous flexible tubing and utilizing a mandrel means comprising a pair of rollers in skew relation wherein both rollers are positively driven for wrapping a strip of material in a synchronized manner and thereby forming a constant and dimensionally stable tube.

A still further object of the present invention includes the provision of a novel mandrel design whereby a strip of material being wrapped therearound for forming a tube is maintained in desired relationship on the rollers of the mandrel means without slipping of the strip of material either axially or circumferentially of the rollers of the mandrel means.

A still further object of the present invention is to disclose a machine for forming a continuous flexible tubing in which means are provided on the frame means of the machine for adjustably mounting a pair of rollers forming the mandrel means.

Various other objects and advantages of the present invention will be readily apparent from the following description of the drawings in which an exemplary embodiment of the invention is shown.

DESCRIPTION

Figure 7:
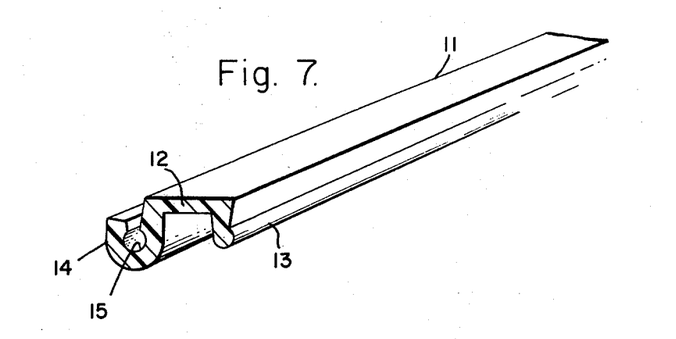
FIG. 7 is a fragmentary perspective view of the strip formed into a continuous tube by the tube forming machine of this invention, the strip including a section showing the cross sectional configuration of the strip.
Figure 8:
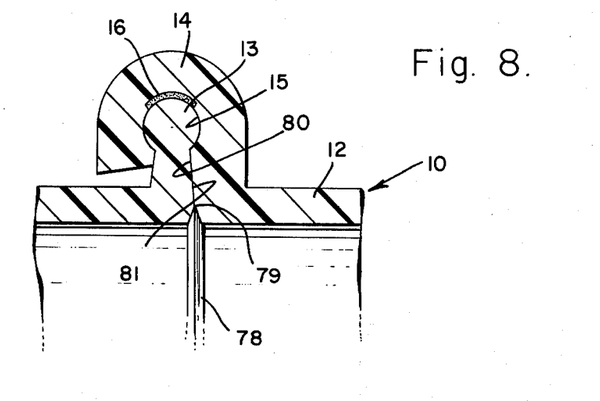
FIG. 8 is an enlarged fragmentary sectional view of interlocked strip portions on one of the rollers of the mandrel means.
Figure 9:
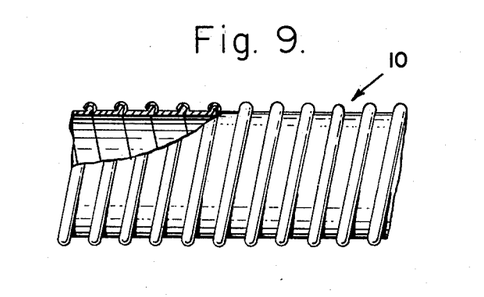
FIG. 9 is a side view partly in section showing a completed tubing.

Referring first to FIGS. 7, 8 and 9, a completed length of tubing generally indicated at 10 is formed from an extruded strip 11 having a flat main web 12 provided with a longitudinally extending edge bead portion 13 extending from one face of the web 12 and a longitudinally extending groove means 14 extending from the other edge of web 12 and providing a longitudinally extending groove 15 configured to receive and mate with the longitudinal edge bead 13 of an adjacent turn of strip 11. The longitudinal bead 13 and groove means 14 provide continuous interlocking strip portions when the strip is helically wound into tubular form. The strip may be made of a resilient self-supporting thermoplastic material such as polyethylene, polypropolene, vinyls, nylon, or other materials suitable for providing a tube or hose having desirable physical and chemical characteristics. As shown in FIG. 8 in exaggerated form, an elongated band of adhesive 16 may be deposited on internal surfaces of groove 15 for bonding with bead 13 when the interlocking portions of the strip are joined. It will be understood that the strip may include other reinforcing elements as shown in U.S. Pat. No. 3,199,541.

Figure 1:
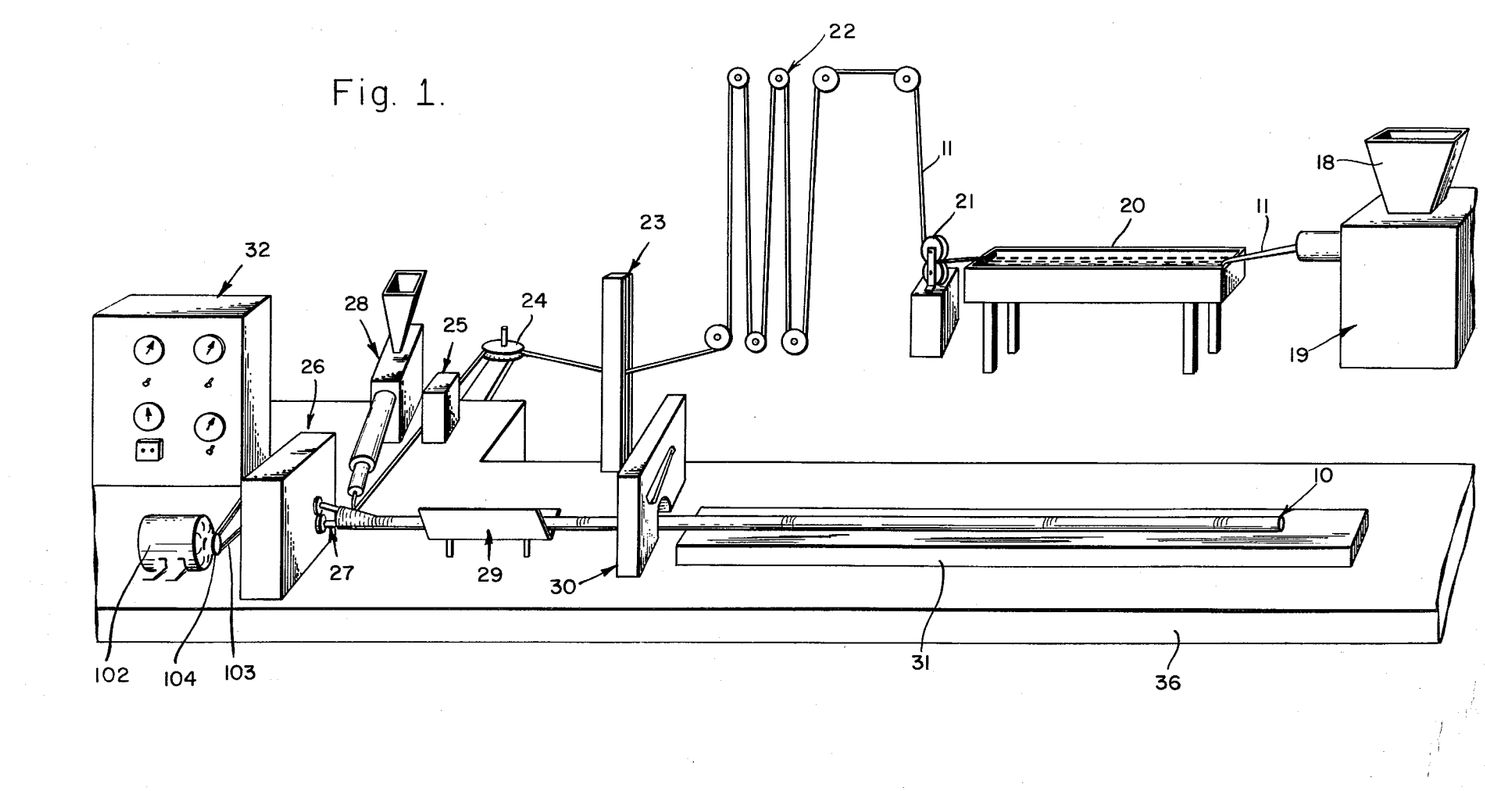
FIG. 1 is a schematic view of a machine for forming a continuous tubing and embodying the method and apparatus of this invention.

FIG. 1 schematically shows a system for continuous production of tube 10. Pellets of suitable selected plastic material may be fed into a hopper 18 for supplying an extruder means 19 of well known manufacture. Extruder means 19 is provided with suitable dies to provide the cross sectional configuration of the extruded strip 11, such extrudate being passed through a cooling water trough 20 by drive or pulling rolls 21. The formed strip 11 passes through an accumulator means 22 of usual loop form, the number of loops provided in the accumulator and the length thereof being controlled by a photocell type control means 23 of well known manufacture. Extruded strip 11 may then be passed around a guide pulley 24 and through a strip tension control means 25 which may comprise a pair of pressure rollers engaging said strip so that as the strip is advanced to the tube forming machine 26, selected tension will be applied to the strip as it is wound upon the mandrel means 27 as more fully described later. In the approach to the mandrel means 27, groove means 14 may be widened to permit the introduction of a continuous band of adhesive supplied by an adhesive extruder 28. The strip is wound in helical fashion on the mandrel means 27 and is discharged from the end of the mandrel means into a water cooling trough means 29 and is then advanced to a tube cutting means 30 where selected lengths of tubing 10 may be cut over an air blower plenum 31 having air jets along its length to facilitate handling of the cut tubing. A suitable console means 32 is provided with necessary controls in well known manner for operation of the system generally described above. It will be understood that the finished tubing 10 may be wound into reels of selected length or may be cut to relatively short lengths depending upon the use for the tubing.

Figure 2:
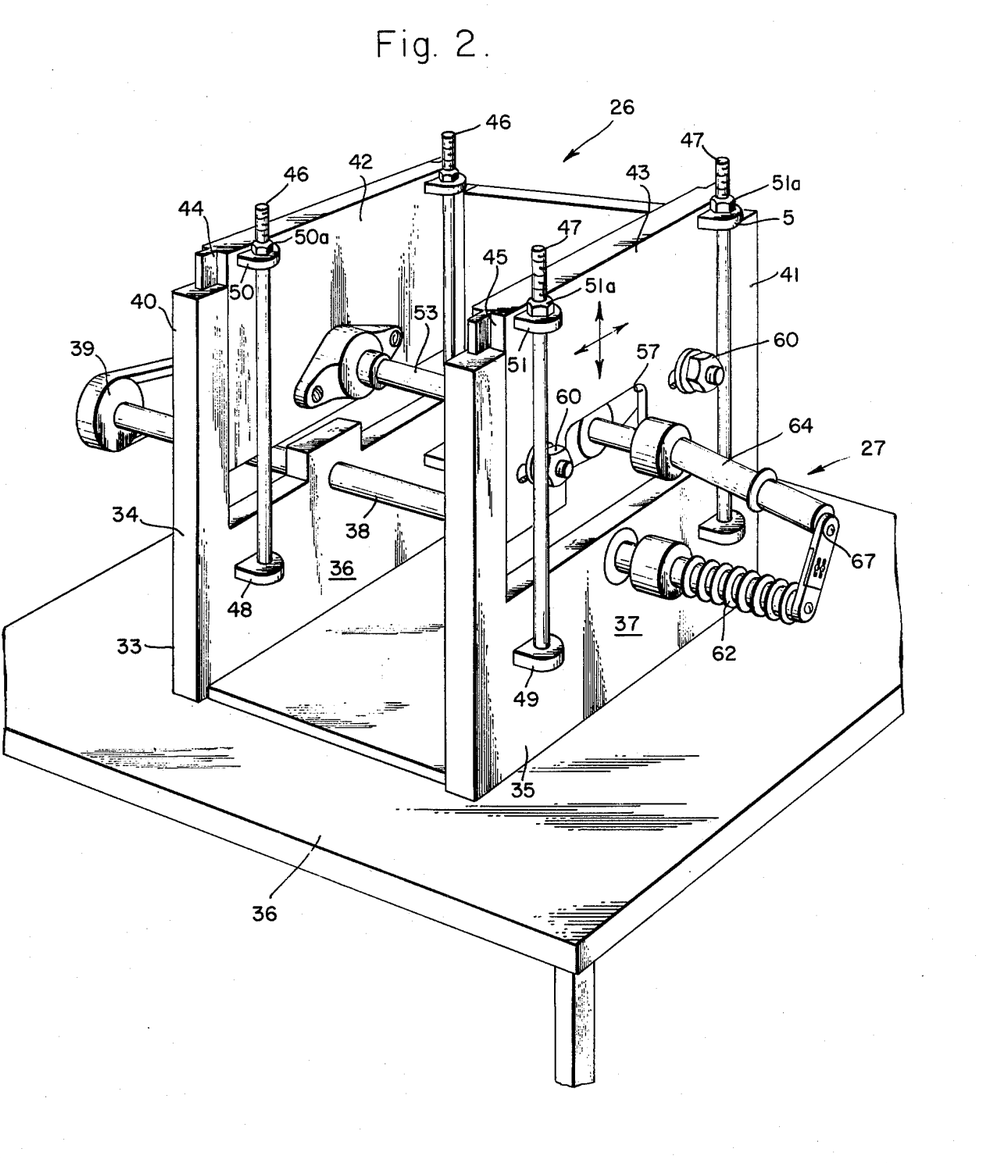
FIG. 2 is a schematic perspective view of the tube forming machine embodying this invention.
Figure 3:
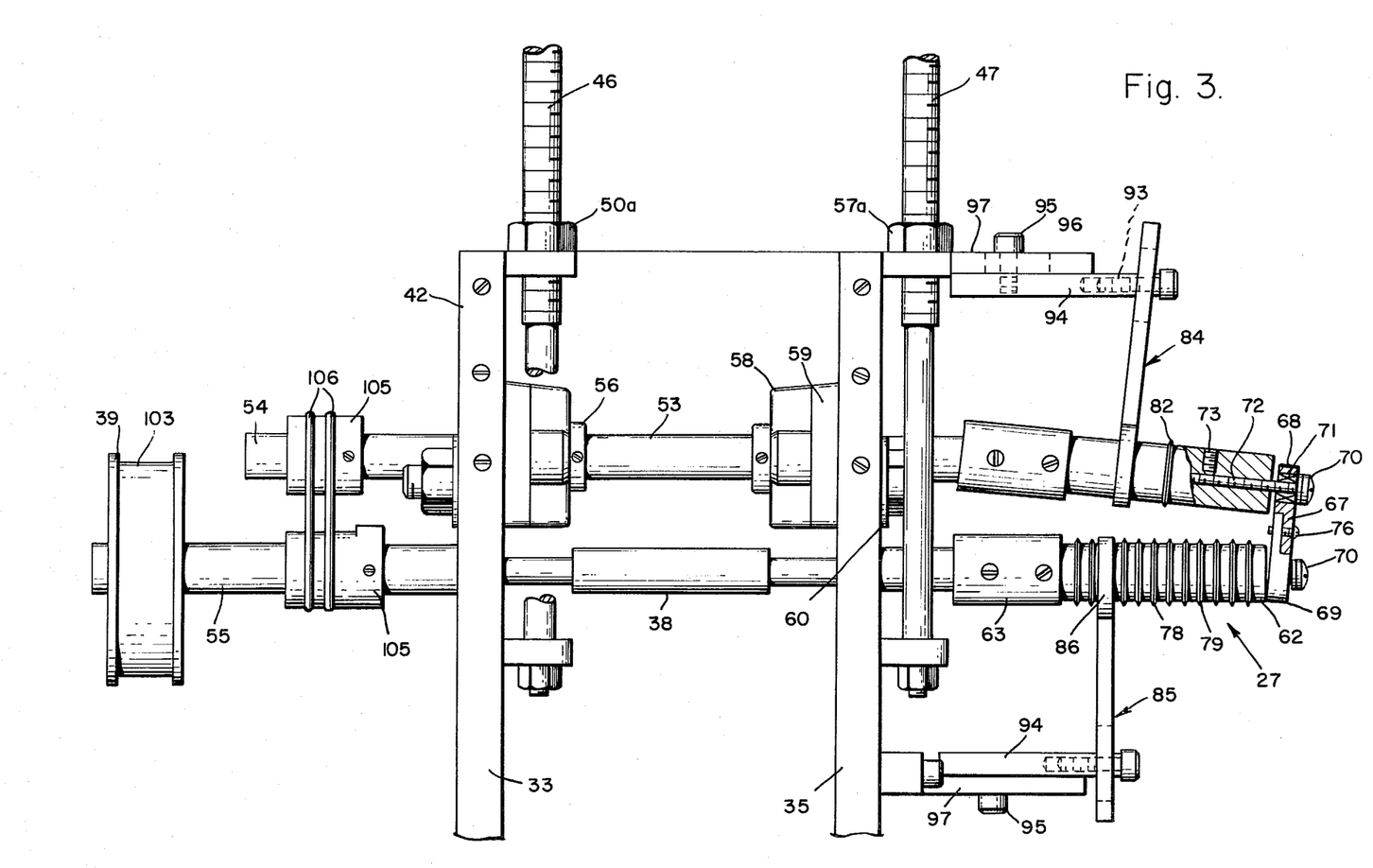
FIG. 3 is a side elevational view of the tube forming machine shown in FIG. 2, the view being partly in section to show the mounting of the end of the rollers forming mandrel means.
Figure 4:
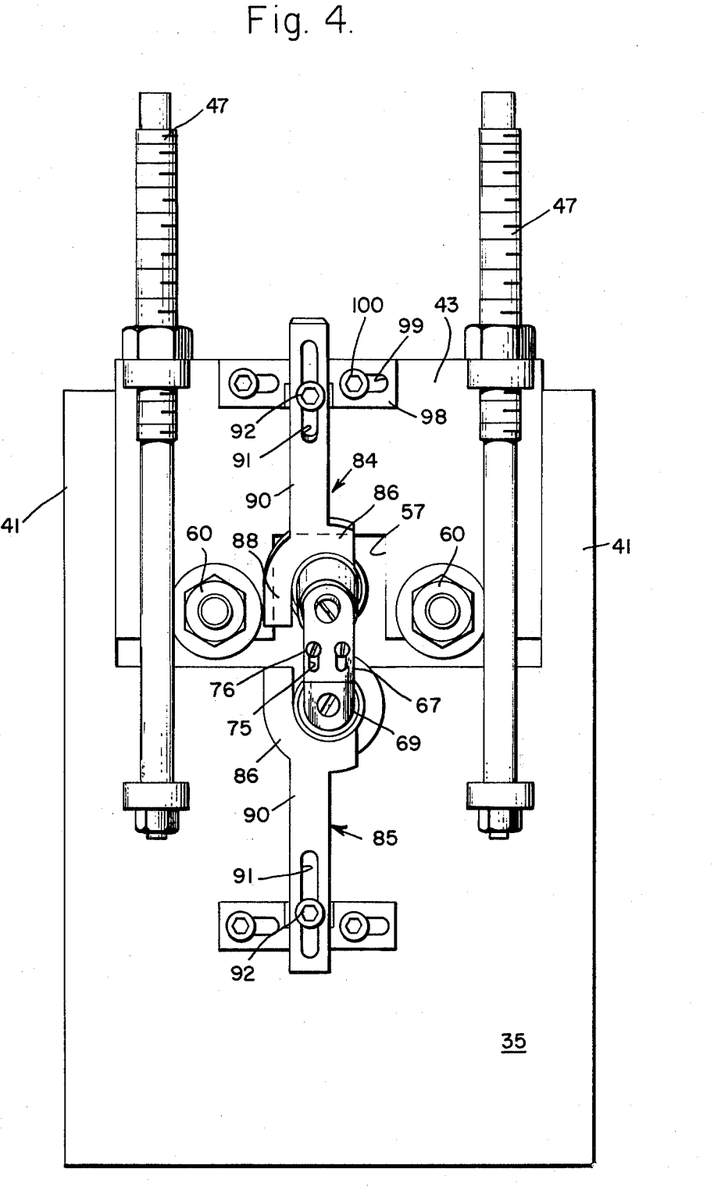
FIG. 4 is an end view taken from the right of FIG. 3.

The machine 26 for forming the tube 10 is best shown in schematic view FIG. 2 and FIGS. 3 and 4. Machine 26 comprises a frame means 33 including spaced upstanding frame walls 34 and 35 suitably supported upon a base means generally indicated at 36. Each frame wall 34 and 35 includes a lower wall portion 36 and 37 through which a fixed drive shaft 38 passes, said drive shaft being mounted in suitable bearings, not shown, in each of wall portions 36 and 37 and extending beyond wall 34 and supporting a drive pulley 39. Frame walls 34 and 35 each include upwardly extending columns 40 and 41 respectively spaced apart to receive vertically adjustable wall portions 42 and 43. Each of the movable wall portions 42 and 43 include edge guide means generally indicated at 44 and 45 of tongue and groove type. Each movable wall 42 and 43 is adjustably vertically positioned by pairs of vertically extending threaded rods 46 and 47 respectively having their lower ends fixed to walls 36, 37 through fixed supports 48, 49. The upper threaded portions of rods 46, 47 extend through upper threaded supports 50 and 51 carried by wall portions 42, 43 respectively. Nuts 50a, 51a respectively provide securement of portions 42, 43 in selected position.

Wall portions 42, 43 support a drive shaft 53 which extends through wall portion 42 to provide a shaft end portion 54 generally parallel to the corresponding end 55 of shaft 38. Upper drive shaft 53 may be mounted in a self-aligning bearing 56 supported on the inner surface of wall portion 42. The wall portion 43 may be provided with a downwardly facing opening 57 through which drive shaft 53 extends, this end of the drive shaft being supported by bearing means 58 having a bearing mount 59 transversely adjustable through bolt and slot means 60 on wall portion 43.

Mandrel means 27 comprises a bottom rotatable roll member 62 connected to drive shaft 38 through a suitable universal means 63. Mandrel means 27 also includes a top roll member 64 rotatably connected to top drive shaft 53 through a universal means 65. Bottom member 62 may have its axis horizontally positioned; and roll member 64 has its axis arranged skew to the axis of roll member 62 by means of the vertical adjustment of wall portion 53, the transverse adjustment of the shaft 53 by bolt and slot means 60, and adjustment of the space between said axes by connecting means 67 at the forward ends of the roll members.

Connecting means 67 comprises lapped connecting members 68 and 69, each member 68, 69 being secured to a respective end portion of each roll member 64, 62 through a screw bolt 70 carried in suitable bearing means 71 in each connector element 68, 69 and threaded in an axial bore as at 72 in the respective roll member 64, 62. A suitable lateral set screw 73 may be turned to fixedly secure the screw bolt 70 in desired position. Connector elements 69 and 67 are secured together by a set of parallel slots 75 in connector element 67, the slots 75 receiving securing bolt screws 76 threaded in connector element 69. The slots permit adjustment of the spacing of the axes of roll members 62, 64 and together with the vertical and lateral adjustment of the wall members 42, 43, the position of roll member 64 may be varied relative to roll member 62 so that the mandrel surface may be enlarged or contracted to permit production of tubing of different diameter.

Bottom roll member 62 comprises a cylindrical body having a plurality of longitudinally or axially spaced annular outwardly extending means in the form of relatively narrow fins 78. Fins 78 are spaced apart the width of web 12 of the strip 11 so that the web 12 of the strip may be received between the fins. Each annular fin 78 is shown as being of triangular cross section, the outermost edge 79 of each fin being formed by surfaces of the fin arranged at an acute angle. Thus, as shown in FIG. 8, the edge 79 is readily received between the opposing face 80 defining one edge of web 12 and the face 81 defining the opposite edge of web 12 as shown in FIG. 8. The plurality of fins 78 on roll member 62 extend for substantially the length of roll member 62, that is, from the universal joint means 63 to the end of roll member 62.

The top roll member 64 is cylindrical having a uniform diameter throughout its length and of the same diameter as roll member 62. Top roll member 64 may be provided with a single radially outwardly extending fin 82 of similar shape as fin 78 of roll member 62. Fin 82 is located approximately centrally of the length of roll member 64 and in this example, is located approximately between the sixth and seventh of fins 78 of member 62. Fin 82 is thus offset axially from the opposed fins 78 to assist in providing and maintaining a helical configuration to the strip 11 during its formation on the mandrel means 27.

Guide and support means for the strip 11 as it is being wound upon the mandrel means 27 may comprise top and bottom guide members 84, 85 of similar construction. Each guide member 84, 85 includes a partially arcuate guide head 86 having on its inner arcuate face a continuous edge groove 87 having a width and depth adapted to substantially enclose with loose tolerances the external configuration of the interlocked joint formed by the groove means 14 and the bead 13 of adjacent turns of strip 11 which have been helically wound on the mandrel. As best seen in FIG. 4, guide head 86 defines an external arcuate path through an angle of less than one hundred and eighty degrees for the interlocked portions of strip 11. Tangent head portions 88 of head 86 permit guiding of the interlocked portions partially across the space between the top and bottom roll members 64, 62.

Means for adjusting the position of guide heads 86 into desired relation with the skew roller members 64, 62 may comprise a vertically extending shank 90 having a longitudinally extending slot 91 therein through which a screw bolt 92 extends for threaded engagement as at 93 with a forwardly projecting support member 94. Support member 94 is forwardly and rearwardly adjustable by a bolt 95 which extends through a slot 96 in a second support member 97 fixed at one end to a mounting plate 98 transversely adjustable on wall portion 43 by a set of slots 99 and bolts 100 extending therethrough and having threaded engagement with wall portion 43.

The position of the guide heads 86 of both guide members 84, 85 may thus be three-dimensionally adjustable to accommodate variations in skew relation of the roll members; that is, adjustable along the length of the mandrel roll members, vertically adjustable depending upon the diameter of the tube to be formed, and transversely adjustable depending upon the relative transverse position of the roll member 64 with respect to roll member 62. In the example of the invention shown, the bottom guide support member 85 is aligned with the third fin from the rear portion of roll member 62 and the top guide member 84 is offset with respect thereto depending upon the pitch of the helical winding to be imparted to the turns of the strip 11.

Means for rotatably driving the drive shafts 38 and 53 may comprise a suitable electric motor 102 mounted on base means 36. Drive pulley means 103 connect the motor shaft 104 with the drive pulley 39 carried at the end 55 of drive shaft 38. Shaft end 55 and upper shaft end 54 each carry a drive collar 105 and 106 respectively provided with spaced annular grooves to receive under suitable tension drive pulleys 106 each of circular cross section. The diameters of drive collars 105 are the same so that each drive shaft 38 and 53 are rotated at the same speed.

In operation of the tube forming system shown in FIG. 1, part of which has been previously described, it will be understood that the strip extruder 19 may be continuously operated in order to provide a continuous length of strip 11 for feeding to the mandrel means 27. It will also be understood that the extruder means 19 may extrude a strip 11 which instead of being passed to an accumulator 22 may be wound upon suitable reels of selected length for later feeding to a mandrel means to provide tubing of selected length. In many instances the continuous uninterrupted forming of the tubing 10 is preferable to satisfy existing demands for the tubing.

Figure 5:
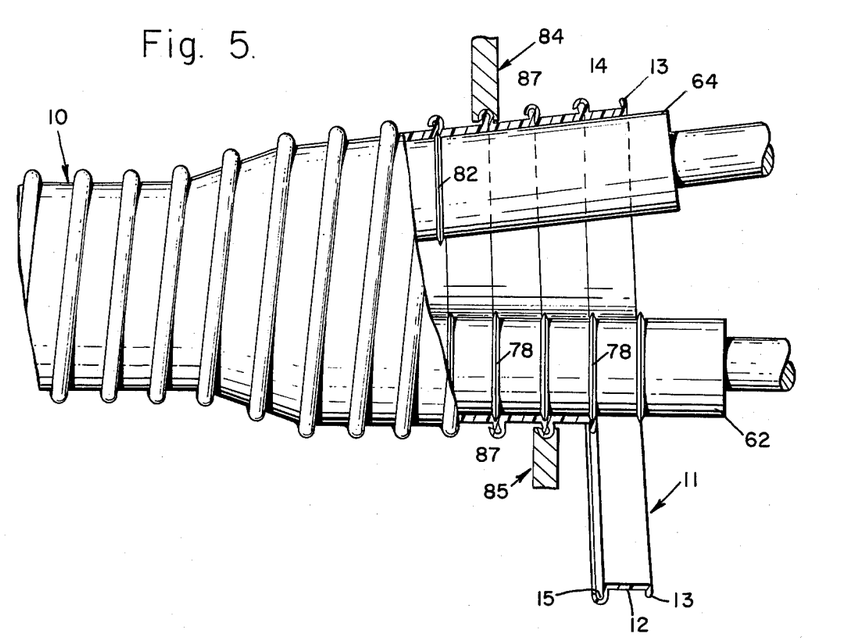
FIG. 5 is a fragmentary side elevational view of the mandrel means of the tube forming machine, the view being partly in section to show winding of the strip on the mandrel means, the approach of the strip to the bottom mandrel being schematically illustrated.
Figure 6:
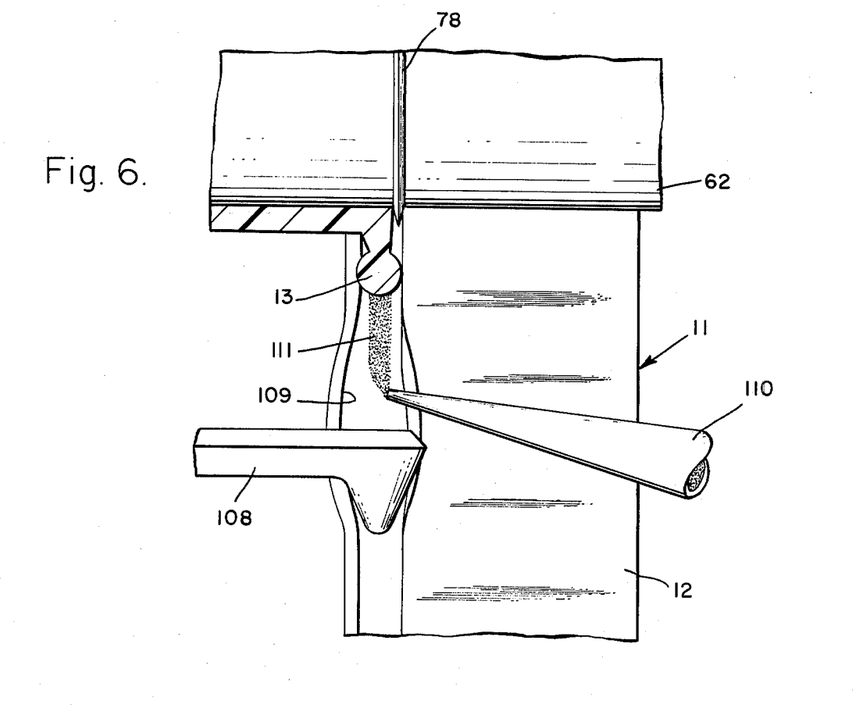
FIG. 6 is an enlarged fragmentary top view of the strip at the bottom roller and the application of adhesive in the groove means on the strip.

Strip 11 emerges from the tension control means 25 with the web 12 having the longitudinal bead 13 facing downwardly and the longitudinal groove 15 facing upwardly as best seen in FIG. 5. As the strip 11 approaches the underside of mandrel roller member 62, a suitable groove spreader tool 108 is positioned in groove 15 to cause a slight spreading thereof as at 109 FIG. 6. A nozzle 110 for applying a band of adhesive 111 to the bottom of the groove 15 is located immediately behind spreader tool 108 and into the spread apart groove for depositing band of adhesive 111. Adhesive nozzle 110 is continuously supplied by the adhesive extruding means 28.

As strip 11 moves into contact with the cylindrical surface of bottom roller member 62, it is fed into position with one edge of web 12 guidably contacting a fin 78. Strip 11 is passed beneath member 62 then upwardly and over roll member 64 and then downwardly to position the other edge of web 12 which has longitudinal bead 13 against the other side of fin 78. The next adjacent fin 78 is contacted by the edge of web 12 adjacent the groove means 14 since the spacing of annular fins 78 is approximately the width of web 12. Thus, as the strip 11 is progressively turned around the roll members 62 and 64, the longitudinal groove 15 is moved over and into interlocking relation with the longitudinal bead 13 of the immediately previous turn. Since the strip 11 is under selected tension as controlled by tension control means 25 and the speed of rotation of the mandrel means, groove means 14 is brought into full interlocked relation with longitudinal bead 13 as the turns of the strip are passed around the mandrel.

Engagement of edges of strip 11 with the annular fins 78 on bottom roll member 62 positively advances strip 11 with turns in interlocked relation along roll member 62. Annular fin 82 of top roll member 64, once turns of the strip have been interlocked on the mandrel means, serves to prevent axial displacement of the strip being wound relative to roll member 64. Slight variations in tension of strip 11 being wound on a smooth surfaced mandrel usually tends to produce axial displacement of the strip being wound relative to such mandrel. The outwardly extending annular fins 78 and 82 restrain such axial displacement because of the containment of a portion of the strip 11 between the spaced annular fins 78 and the partial penetration of fin 82 at a joint between adjacent strip turns as the strip is passed over upper mandrel roll member 64.

As mentioned above, roll members 62 and 64 are not parallel and are in skew relationship. In this example, bottom roll member 62 is positioned horizontally with its axis normal to walls 36, 37. The upper roll member 64 slopes downwardly with respect to the horizontal bottom roll member 62 and is disposed at another angle offset 90 degrees with respect to the downward angle of the roll member 64. Such biangularity of the axis of the top roll member 64 with respect to the bottom roll member 62 causes linear movement of the hose being wound around the two roll members towards the free ends of the roll members. The formed hose moves off the free ends of the mandrel and has an internal diameter approximately but slightly less than the circumference of the surfaces of the two roll members 62, 64 about which turns of the strip are wrapped. It will be understood that in wrapping the turns of the strip about the mandrel roll member 62, 64, the strip may be slightly stretched because of the amount of tension imparted to the strip by the tension control means. Therefore, as the wound hose moves off the ends of the mandrel roll members there may be a slight contraction of the inner diameter of the hose and this factor must be considered in determining the mandrel circumference in order to control the inner diameter of the finished hose.

One of the advantages of the above described mandrel structure is that one set of mandrels may be used for manufacture of hoses having internal diameters of between one to three inches. The change in diameter of the finished hose is readily made by vertical, horizontal and angular adjustment of the top mandrel roll member 64 relative to the bottom mandrel member as described above. Hose internal diameters of from three to six inches may be readily made by the apparatus 26 by using a set of mandrel roll members of greater outer diameter than those used for the smaller hose diameters. A second set of mandrel roll members may be used for producing hose having internal diameters of from three to six inches. It will be understood that while hose diameters are usually standardized, a specific hose diameter may be readily made by this apparatus because the mandrel roll members may be readily adjusted relative to each other to provide any specific internal hose diameter within the range of diameters for which the roll members are designed.

The apparatus of this invention is thus quite versatile in the different types of products which may be made on the apparatus by varying the spacing and angles of the mandrel roll members, the design of the mandrel roll members with respect to pitch and length. It will be understood that because of the positive engagement of the fins on the two mandrel members with the turns of the strip being wrapped therearound, that the cross sectional shape of the strip being wrapped around the mandrel may be varied. In addition, the various reinforcing devices described in the Richitelli U.S. Pat. No. 3,199,541 may also be incorporated in the hose structure if desired.

It should be noted that the system described above provides for continuous manufacture of hose by helically winding the strip about a readily adjustable mandrel means. Finished hose may be produced at a rate of thirty lineal feet per minute. The finished hose produced by the apparatus and method described above is characterized by all of the advantages of the hose described in the Richitelli U.S. Pat. No. 3,199,541 which includes flexibility, an interlocked seal along the helical joints against leaking, resistance to axial tension and radial forces because of the interlocking joint construction, the prevention of distortion of the shape of the hose by torsional forces, the maintenance of desired shape, and the provision of the generally smooth internal cylindrical surface which minimizes frictional resistance to the flow of fluids therebetween.

The finished hose is readily made by the method of this invention in that the internal surface structure of the hose strip is positively engaged by the mandrel means to limit creeping, slipping and axial displacement and also by the positive engagement of the external configuration of the joint by the top and bottom guide members which assure positive contact sealing of the band of adhesive with the internal surfaces of the groove means and the external surfaces of the longitudinal bead in the interlocked joint.

It is understood that modifications and changes may be made in the apparatus and method described above which fall within the spirit of this invention and all such changes and modifications coming within the scope of the appended claims are embraced thereby.

We claim:

1. In a machine for forming a continuous tube from a strip of flexible material having a cross sectional configuration including cooperable external edge interlocking portions when helically wound, the combination of:
   a frame means;
   a pair of spaced askew related rollers mounted on said frame means and positioned to define an inner cylindrical surface of the tube to be formed by helically winding the strip about said rollers;
   at least one of said rollers having axially spaced outwardly extending means to partially receive said strip therebetween portions;
   means for rotating said rollers for helically winding said strip thereabout to interlock said edge interlocking portions and for progressively forming said tube;
   means on said frame means for adjusting the askew relationship of said rollers; and
   means on said frame means and means at ends of said rollers for adjusting the spacing between said rollers to provide for the forming of continuous tubing of different diameter.

2. In a machine as stated in claim 1 including
   driving means on said frame means for rotating both of said rollers at the same speed.

3. In a machine as stated in claim 2 wherein said driving means for rotating both of said rollers includes means for directly driving said one of said rollers;

and means cooperably connecting said other roller to said one roller for rotating both of said rollers.

4. In a machine as stated in claim 1 wherein the other of said rollers includes second outwardly extending means cooperable with said interlocked edge portions.

5. In a machine as stated in claim 1 including means for applying adhesive to one of the edge portions of the strip before the strip is wound in interlocking relation on the pair of rollers.

6. In a machine as stated in claim 1 including guide means cooperable with the external configuration of the edge interlocking portions for imparting guiding pressure thereto and for maintaining contact of said adhesive with both of said interlocking edge portions.

* * * * *